United States Patent

[11] 3,624,211

| [72] | Inventor | Marcel Georges Meiffren<br>Meudon, France |
|---|---|---|
| [21] | Appl. No. | 620,274 |
| [22] | Filed | Mar. 3, 1967 |
| [45] | Patented | Nov. 30, 1971 |
| [73] | Assignee | Etablissement Public: Office de la Recherche Scientifique et Technique Outre-Mer<br>Paris, France |
| [32] | Priority | Mar. 3, 1966 |
| [33] | | France |
| [31] | | 51943 |

[54] FUNGICIDAL AND BACTERICIDAL METHOD
3 Claims, No Drawings

[52] U.S. Cl. .................................................. 424/195
[51] Int. Cl. ........................................... A01n 9/08, A61k 27/14
[50] Field of Search .................................. 424/195; 260/236.5

[56] References Cited
OTHER REFERENCES

U. S. Dispensatory, Part I, 19, pp. 913— 915
Steinmetz Codex Vegetabilis, 1957, pp. 903– 926
Pharmaceutical Formulas, Vol. I, 1947, pp. 183,184,185,191,242

*Primary Examiner*—Albert T. Meyers
*Assistant Examiner*—Dale R. Ore
*Attorney*—Littlepage & Quaintance

ABSTRACT: Process for controlling bacteria and fungi using a solvent extract of the plant "Prunus lusitanica."

FUNGICIDAL AND BACTERICIDAL METHOD

This invention relates to the production of a bactericidal and fungicidal product, consisting of a new substance extracted from a rosaceous plant, and more particularly from its leaves. This plant being more generally known under the name of *Prunus lusitanica* (Linne) or *Cerasus lusitanica* (*l*) (*Miller*).

For the requirements of the invention use can also be made of varieties of this plant given under the following reference in the Kewensis Plantarum Phanerogamarum index: "Prunus lusitanica Gueldenst. ex Ledeb. Fl. Ross. ii. 9-P laurocerasus, lusitanica, Linn. Sp. P1473 Europe Austr." Section III. p. 636, 1894. This plant is found more especially in Portugal.

The invention has shown that extracts of said plant made with inorganic or organic solvents, have a fungistatic and bactericidal action. These solvents are for instance, water, trichloroethylene, benzene, petroleum either, ethyl ether, chloroform or ethanol, amongst others. By extraction with these solvents a certain amount of the active substance passes in solution from the plant into the solvents, and this in amounts which vary according to the conditions of extraction and, essentially, according to the nature of the solvent.

The action of various extracts on phytopathogenic fungi were compared qualitatively. To this end a method used in bacteriology for antagonism tests was employed. Pieces of paper were respectively dampened with the extracts being examined and were placed in Petri dishes seeded with the mass with phytopathogenic fungi. Among the solvents tested water and trichloroethylene provided the most active extracts. Steam and trichloroethylene extracts gave rise to the largest inhibition areas, and a fungicidal action was observed throughout the Petri dish. Benzene, petroleum ether and ethyl ether extracts, in this order, exert a considerably inhibiting effect of variable intensity.

According to an advantageous method of obtaining the substance of the invention the air-dried leaves of "Prunus lusitanica" are round into a fine, homogenous powder, said vegetable powder is mixed with water, said mixture is stirred and it is left to macerate for a period of time, after which it is subjected to steam stripping or distillation. Said mixture preferably comprises about 8 parts vegetable powder to 100 parts water. The maceration time is advantageously in the range about 48 hours.

Particulars of the conditions of extraction by trichloroethylene, as well as by distillation or steam stripping will be given hereinafter by way of explanation.

EXAMPLE 1 EXTRACTION WITH TRICHLOROETHYLENE.

Leaves of "Prunus lusitanica" were thoroughly washed in water and dried. They were then cut into small pieces and grounds in trichloroethylene until a homogenous slurry was obtained, which was filtered on slow paper in an evaporation flask and rinsed with trichloroethylene until the liquid was colorless. Cellulose powder was then added to the filtrate which had been vacuum concentrated in a rotary evaporator, the water bath being maintained at a temperature of about 35° C. Evaporation was stopped when the extract was dry. The powder thus obtained was eluted by petroleum ether (40°–65° C.) on a column of cellulose powder. The first fraction eluted by the solvent contained the active substance and was yellow in color. Elution was stopped when the eluate had become colorless. After evaporation of the solvent this fraction was taken up by vaseline oil or water. It was used in both these forms in the biological tests described hereinafter.

EXAMPLE 2 PRODUCING THE SUBSTANCE OR DISTILLATION OR STEAM STRIPPING 40 g. of air-dried leaves of ti Prunus lusitanica are ground. The resulting powder is agitated in a mixer with 450 ml. water for about 10 minutes. The slurry obtained is poured into a flask for distillation or steam stripping. It is left to macerate for about 48 hours. The distillate is then collected in a vessel which is preferably kept cold in an ice bath.

For distillation the flask, placed in an electric flask heater, is topped with a Vigreux column which is orientated with an oblique joint on a vertical condenser. After distillation the condensed vapor flows out through a bent tube inserted into the receiving vessel.

In the case of steam stripping, the steam generator (vessel containing boiling water) is connected to the flask containing the maceration, by a rubber tube prolonged by a bent glass tube inserted to the bottom of this flask. Connected to this flask by a bent joint is a vertical condenser in which the vapor containing the active substance condenses and is then collected, as in the previous example, preferably in a cooled vessel.

Characterization of the active antifungal and bactericidal substance was carried out by chromatography in thin layers.

The plates for chromatography were made from a mixture of 100 ml. sodium acetate solution 0.02 M and 50 g. of silica gel marketed under the name "Kieselgel G." These plates were activated for one hour at 110° C.

Highly concentrated extracts of trichloroethylene (example 1) or aqueous solutions obtained by distillation or steam stripping (example 2) were used to reveal the active substance. A drop of the substance as placed near the lower edge of the plate, then the lower edge of the plate was soaked in the solvent selected for chromatography. Vaporization of a 0.2 percent solution of dichloro (R) fluorescein in ethanol (95°) produced a brown-mauve spot on a slightly fluorescent ground on the plate after about 30 minutes.

The $R_f$ values of the substance thus revealed, and calculated for four solvents, are given below:

| | $R_f$ |
|---|---|
| 1. sulfuric ether | 0.96 |
| 2. sulfuric ether-trichloroethylene ½ | 0.56 |
| 3. chloroform-acetic acid 95/0.5 | 0.22 |
| 4. benzene-ammonia N/10 100/10 | 0.22 |

It will be noted that there is complete identity of the characteristics obtained with the trichloroethylene extract and the distillate.

It should be added that the active substance is most often found preceeded by a spot, which is yellow in visible light and fluorescent yellow edged with blue in ultraviolet light, and which after being developed by dichlorofluoresceine appears bright yellow and is then very fluorescent. The characteristic $R_f$ values of this latter spot are as follows for the above-mentioned four solvents:

| | $R_f$ |
|---|---|
| 1. sulfuric ether | 0.96 |
| 2. sulfuric ether-trichloroethylene ½ | 0.92 |
| 3. chloroform-acetic acid 95/0.5 | 0.91 |
| 4. benzene-ammonia N/10 100/10 | 0.86 |

In the applications described hereinafter either the purified substance itself or its solutions were used, that is crude extracts prepared by treating leaves of Prunus lusitanica with various solvents, and more especially those such as water and trichloroethylene or aqueous solutions obtained by distillation or steam stripping.

The antifungic activity of the new substance described in the invention was studied in the following manner.

Using either a liquid medium known as Czapek-Dox, having the following formula:

| | |
|---|---|
| distilled water | 1000 ml. |
| sodium nitrate | 2 g. |
| potassium chloride | 0.5 g. |
| monobasic potassium phosphate | 1 g. |
| magnesium sulfate | 0.5 g. |
| ferrous sulfate | 0.01 g. |
| glucose | 30 g. | or a solid medium known as Sabouraud. This latter medium is a maltose test medium. To prepare this 10 g. peptone are boiled in 1000 ml. water for a few minutes. 20 g. gelose are then added and the liquid is placed in an autoclave heated to 115°–120° C. for about 45 minutes. A solution of crude maltose is prepared in a small amount of warm distilled water and is added to the peptone-gelose solution from the autoclave. After the medium is stirred it is sterilized at 110° C. for about 20 minutes and is then left to cool and the desired solid medium is obtained.

If the above-mentioned Czapek-Dox liquid medium is used, the active substance in solution is mixed with this medium, without addition of any antibacterial antibiotic, as the active extract of the invention has a bactericidal and bacteriostatic action. If the Sabouraud solid medium described above is used the gelose of said medium is first melted at a temperature of about 50° C., then the active substance in solution is added. In both cases the test tubes are placed in an oblique position in a known manner and the media are inoculated with fungic agents and compared with control cultures of said agents. It should also be noted that Petri dishes can be used.

A series of tests carried out in the manner described above has shown that at a dose of active substance corresponding to 16 mg. dry weight of the starting vegetable material by milliliter of reaction mixture, the substance according to the invention, pure or in extracts, completely inhibited the growth of filamentous fungi and especially that of the following parasites:

Phytopathogenic fungi:
-Colletotrichum coffeanum
-Pestalozzia coffeicola
-Marasmius perniciosus
-Fusarium xylarioides
-Helminthosporium oryzae
-Botrytis cinerea
-Phytophthora palmivora Systematic examination of the fungicidal activity of the active substance of the invention was carried out by tests consisting of pulverizing aqueous solutions of the active extract. These tests revealed an effect on wheat oidium caused by Erisyphe graminus and on bean rust caused by Uromyces appendiculatus.

Furthermore, the substance of the invention at a dose of 9 mg./ml. by dry weight of the starting vegetable material has a completely inhibiting effect on pathogenic agents of human mycosis, especially on Epicoccum flocosum
Microsporum canis
Trichophyton agrophytes
Aspergillus fumigatus
Absidia corymbifera
Histoplasma capsulatum In addition, at a stronger dose corresponding to 28 mg./ml. of dry vegetable starting material, inhibition of the growth of yeastlike forms, especially that of Candida albicans is observed.

In tests on living animals the action of the active substance of the invention on guinea-pig tinea and on candidiasis of the foreskin of the guinea-pig is very rapid.

Moreover, the substance has a widespread antibacterial action. As an example, tests were carried out on four bacteria normally used for quantity determination of antibiotics and in the search for substances which are active against pathogenic bacteria, two gram-positive and two gram-negative bacteria.

There is total inhibition of growth, in a solid Sabouraud medium and liquid Panassay medium, of Klebsiella sp. Pasteur Institute strain n°53,153 at a dose of 23 mg./ml. of Bacillus subtilis Pasteur Institute strain n°5,262; of Sarcina lutea Pasteur Institute strain n°5,345 and Escherichia coli Pasteur Institute strain n°54,127 at doses of 36 mg./ml. by dry weight of the starting vegetable material.

I claim

1. A process for controlling "Phytopathogenic fungi" which comprises treating such fungi with a fungicidally effective amount of a solvent extract of the leaves of a rosaceous plant "Prunus lusitanica," obtained by the solvent extraction of said leaves with a solvent selected from the group consisting of water, trichloroethylene, benzene, petroleum ether, ethyl ether, chloroform, and ethanol.

2. A process for controlling fungi causing human mycosis which comprises treating said fungi with a fungicidally effective amount of a solvent extract of the leaves of a rosaceous plant "Prunus lusitanica," obtained by the solvent extraction of said leaves with a solvent selected from the group consisting of water, trichloroethylene, benzene, petroleum ether, ethyl ether, chloroform, and ethanol.

3. A process for controlling pathogenic bacteria which comprises treating said bacteria with a bactericidal amount of a solvent extract of the leaves of a rosaceous plant "Prunus lusitanica," obtained by the solvent extraction of said leaves with a solvent selected from the group consisting of water, trichloroethylene, benzene, petroleum ether, ethyl ether, chloroform, and ethanol.

* * * * *